United States Patent
Kato

(10) Patent No.: US 11,550,508 B2
(45) Date of Patent: Jan. 10, 2023

(54) SEMICONDUCTOR STORAGE DEVICE AND CONTROL METHOD THEREOF

(71) Applicant: Kioxia Corporation, Tokyo (JP)

(72) Inventor: Yohei Kato, Tokyo (JP)

(73) Assignee: KIOXIA CORPORATION, Tokyo (JP)

(*) Notice: Subject to any disclaimer, the term of this patent is extended or adjusted under 35 U.S.C. 154(b) by 1 day.

(21) Appl. No.: 17/173,459

(22) Filed: Feb. 11, 2021

(65) Prior Publication Data
US 2021/0303213 A1  Sep. 30, 2021

(30) Foreign Application Priority Data

Mar. 30, 2020  (JP) .............................. JP2020-060543

(51) Int. Cl.
*G06F 3/06*  (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ...... G06F 3/0679; G06F 3/0688; G06F 3/064; G06F 3/0656; G06F 12/0246; G06F 11/1068; G06F 11/1072; G06F 11/1103; G06F 11/3034; G06F 11/3476; G06F 11/0788; G06F 11/0775; G06F 2201/86; G06F 9/542; G06F 2212/7203
See application file for complete search history.

(56) References Cited

U.S. PATENT DOCUMENTS

| | | | |
|---|---|---|---|
| 7,406,487 B1* | 7/2008 | Gupta | ..................... G06F 16/27 |
| 2010/0169597 A1* | 7/2010 | Yonezawa | ........... G06F 12/0246 |
| | | | 711/E12.001 |
| 2014/0173233 A1* | 6/2014 | Higashiyama | .......... G06F 3/065 |
| | | | 711/162 |
| 2019/0073258 A1 | 3/2019 | Young et al. | |
| 2019/0129774 A1 | 5/2019 | Konan et al. | |
| 2019/0265931 A1 | 8/2019 | Kasahara | |

* cited by examiner

*Primary Examiner* — Reginald G Bragdon
*Assistant Examiner* — Curtis James Kortman
(74) *Attorney, Agent, or Firm* — Foley & Lardner LLP

(57) ABSTRACT

A semiconductor storage device includes a non-volatile first memory, a second memory that includes a first area for recording data to be recorded in the first memory and a second area for recording data read from the first memory, and a memory controller that controls the first memory. The memory controller acquires event logs for each event, adds a footer that specifies the data start position of the event log to an end of each of the event logs, sequentially records the event logs to which the footer is added in an order of occurrence of the event from a low address toward a high address of the first area, stores a plurality of the event logs which are recorded in the first area and has the footer added to the plurality of the event logs in the first memory, and sequentially reads the plurality of event logs stored in the first memory in an order from a latest event log, based on content of the footer added to each event log, to sequentially record the read event logs from a low address toward a high address of the second area in a read order of the read event logs.

20 Claims, 6 Drawing Sheets

SEMICONDUCTOR STORAGE DEVICE AND CONTROL METHOD THEREOF

CROSS-REFERENCE TO RELATED APPLICATION

This application is based upon and claims the benefit of priority from Japanese Patent Application No. 2020-060543, filed Mar. 30, 2020, the entire contents of which are incorporated herein by reference.

FIELD

Embodiments described herein relate generally to a semiconductor storage device and a control method thereof.

BACKGROUND

A semiconductor storage device generates a log (event log) relating to an event thereof each time an event occurs and stores the generated log in a storage area in a readable manner. When a log read request is received from a host, the semiconductor storage device is configured to generate a Reporting Context from event logs stored in the storage area and transmit a log page in which the event logs are arranged in the latest order to the host. Here, the Reporting Context is information indicating a configuration of the log data generated by a controller. When transmitting a log page to the host, the requested event logs are required to be arranged in the latest order.

A semiconductor storage device stores data in a storage area in a certain amount of recording units. Therefore, the semiconductor storage device stores data in a buffer until the stored data becomes a recording unit and transfers the stored data of the recording unit to the storage area. Since an event log is generated each time an event occurs, when the log is stored in the storage area for each event type, storing timing will be changed depending on types of the event. Accordingly, the semiconductor storage device stores all event logs in the order of occurrence regardless of the types of the event. However, since a log page in which event logs are arranged in the latest order is requested to be transmitted, the semiconductor storage device may not satisfy this request when the stored event logs are provided as is.

DETAILED DESCRIPTION

At least one embodiment provides a semiconductor storage device for suitably transmitting a requested log and a control method thereof.

In general, according to at least one embodiment, a semiconductor storage device includes a non-volatile first memory; a second memory that includes a first area for recording data to be recorded in the first memory and includes a second area for recording data read from the first memory; and a memory controller that controls the first memory. The memory controller acquires event logs relating to each event that occurs in the semiconductor storage device, adds a footer that specifies a start position of data of the event logs to an end of each of the event logs, sequentially records the event logs to which the footer is added in an order of occurrence of the event from a low address toward a high address of the first area, stores a plurality of the event logs which are recorded in the first area and the footer is added to in the first memory, and sequentially reads the plurality of event logs stored in the first memory in an order from a latest event log based on content of the footer added to each event log to sequentially record the read event logs from a low address toward a high address of the second area in a read order of the read event logs.

Further, according to at least one other embodiment, a semiconductor storage device includes a non-volatile first memory; a second memory that includes a first area for recording data to be recorded in the first memory and includes a second area for recording data read from the first memory, and a memory controller that controls the first memory. The memory controller acquires event logs relating to each event that occurs in the semiconductor storage device, sequentially records the event logs in an order of occurrence of the each event from a high address toward a low address of the first area, stores a plurality of the event logs recorded in the first area in the first memory, and sequentially reads the plurality of event logs stored in the first memory from a low address toward a high address in the first memory to sequentially record the read event logs in a read order from a low address toward a high address of the second area.

First Embodiment

Figure 1:
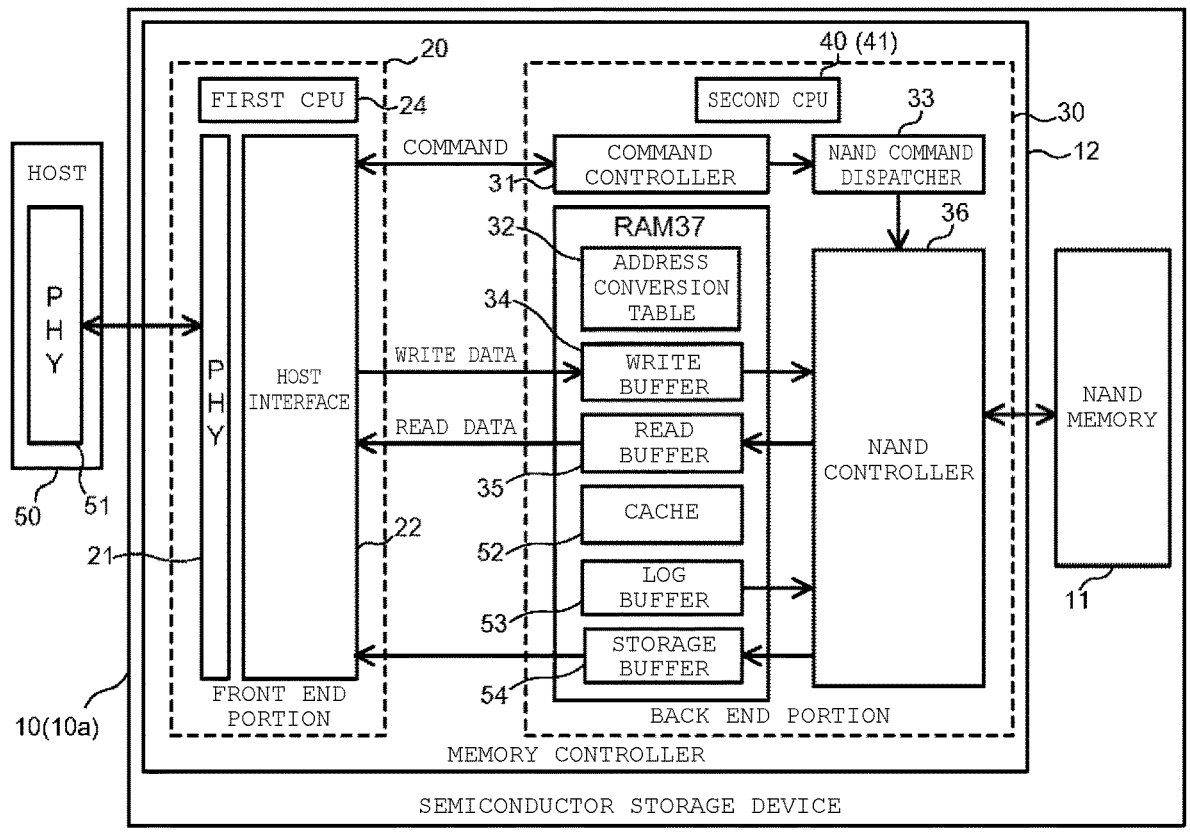
FIG. 1 is a block diagram illustrating a configuration of a semiconductor storage device according to a first embodiment.

Hereinafter, embodiments will be described in detail with reference to the drawings. FIG. 1 is a diagram schematically illustrating an example of an overall configuration of a semiconductor storage device according to a first embodiment. As illustrated in FIG. 1, a semiconductor storage device 10 includes a NAND flash memory (hereinafter, referred to as a NAND memory) 11 and a memory controller 12. As an example, the semiconductor storage device 10 includes a solid state drive (SSD) or a universal flash storage (UFS) device using the NAND memory 11 as a storage medium. That is, the semiconductor storage device 10 according to at least one embodiment is a memory system. The semiconductor storage device 10 is capable of being connected to a host 50.

The NAND memory 11 (an example of a first memory) is a storage medium capable of non-volatilely storing information. The NAND memory 11 stores, for example, user data transmitted from the host 50, management information of the semiconductor storage device 10, system data, log data of the host 50 and the semiconductor storage device 10, and the like. Further, the NAND memory 11 is configured with, for example, a plurality of memory chips, and each memory chip includes a plurality of physical blocks. The NAND memory 11 is an example of a storage unit according to at least one embodiment.

The memory controller 12 performs writing data to the NAND memory 11, reading data from the NAND memory 11, or the like, according to a command from the host 50. The memory controller 12 includes a front end portion 20 and a back end portion 30.

The front end portion 20 has a function of transmitting a command received from the host 50 to the back end portion 30 and returning a response to a command from the back end portion 30 to the host 50. The front end portion 20 includes a physical layer circuit (PHY) 21, a host interface circuit 22, and a first CPU 24.

The first CPU 24 controls the front end portion 20 based on firmware. Further, the first CPU 24 can perform various controls by executing a program read from a memory device such as a ROM (not illustrated).

The PHY 21 corresponds to an input/output unit for the host 50 and exchanges an electrical signal with a PHY 51 provided in the host 50 and corresponding to an input/output unit of the host 50.

The host interface circuit 22 performs protocol conversion between the back end portion 30 and the host 50, and controls a transfer (transmission and reception) of data, commands, and addresses. The host interface circuit 22 controls a transfer of data and the like to and from the host 50 based on, for example, a standard of PCIe (registered trademark).

The back end portion 30 has a function of writing and reading data to and from the NAND memory 11 based on a command from the front end portion 20. The back end portion 30 includes a command controller 31, a NAND command dispatcher 33 (hereinafter referred to as a dispatcher 33), a NAND controller 36, a RAM 37, and a second CPU 40.

The RAM 37 (an example of a second memory) has a storage area including an address conversion table 32, a write buffer 34, a read buffer 35, a cache 52, a log buffer 53, and a storage buffer 54. The RAM 37 is, for example, a static random access memory (SRAM), a dynamic random access memory (DRAM), a synchronous dynamic random access memory (SDRAM), or the like. The RAM 37 may be provided outside the memory controller 12.

The address conversion table 32 is information indicating a correspondence between a logical address designated by a command from the host 50 and a physical address of the NAND memory 11. The address conversion table 32 is read from the NAND memory 11 and stored in the RAM 37 when the semiconductor storage device 10 starts up. Further, the address conversion table 32 is updated in response to a change in a correspondence between the logical address and the physical address. The address conversion table 32 is stored in the NAND memory 11 at a particular timing (for example, when a power supply is disconnected or every particular time).

The write buffer 34 temporarily stores data to be written to the NAND memory 11. Data is transferred to the write buffer 34 in response to a write command transmitted from the front end portion 20 to the back end portion 30. This data is transferred via the host interface circuit 22.

The read buffer 35 temporarily stores data read from the NAND memory 11. This data is written to the read buffer 35 via the NAND controller 36.

The cache 52 is an area in which part of the data stored in the NAND memory 11 is cached. The cache 52 is a read cache, and when target data to be read by the host 50 is stored in the cache 52, the target data is read from the cache 52 instead of the NAND memory 11. The cache 52 may be provided in a DRAM or the like outside the memory controller 12.

The log buffer 53 (an example of a first area) is an area for temporarily recording an event log when an event occurs in the host 50 or the semiconductor storage device 10. The log buffer 53 has a recording area for recording a plurality of event logs and footers of the event logs. Data recorded in the log buffer 53 is then stored in the NAND memory 11. The storage buffer 54 (an example of a second area) is an area for temporarily recording an event log when generating Reporting Context based on the event log. The storage buffer 54 has a recording area for recording a plurality of event logs. That is, event logs read from the NAND memory 11 are subsequently recorded in the storage buffer 54. When a log page is output in response to a request from the host 50, content recorded in the storage buffer 54 becomes data of a log page. Here, an event includes a process performed by the semiconductor storage device 10.

The second CPU 40 controls the back end portion 30 based on firmware. Further, the second CPU 40 can perform various controls by executing a program read from a memory device such as a ROM (not illustrated). In at least one embodiment, the second CPU 40 has a function of acquiring, storing, and providing logs in the host 50 or the semiconductor storage device 10.

When receiving a command from the front end portion 20, the command controller 31 identifies (determines) a type of the command (a write request command, a read request command, and the like) and transmits the command to the dispatcher 33.

The dispatcher 33 converts a command from the front end portion 20 into a command to be transmitted to the NAND controller 36 and transmits the command to the NAND controller 36.

The NAND controller 36 controls reading or writing of data from or to the NAND memory 11 based on an address. For example, when receiving a write command from the dispatcher 33, the NAND controller 36 acquires write data from the write buffer 34 to write the write data to the NAND memory 11 based on the write command. When receiving a read command from the dispatcher 33, the NAND controller 36 reads data to be read from the NAND memory 11 to store the read data in the read buffer 35 based on the read command. Likewise, log data including a plurality of event logs is acquired from the log buffer 53 to be written to the NAND memory 11. Further, an event log is read from the NAND memory 11 to be stored in the storage buffer 54.

Figure 2:
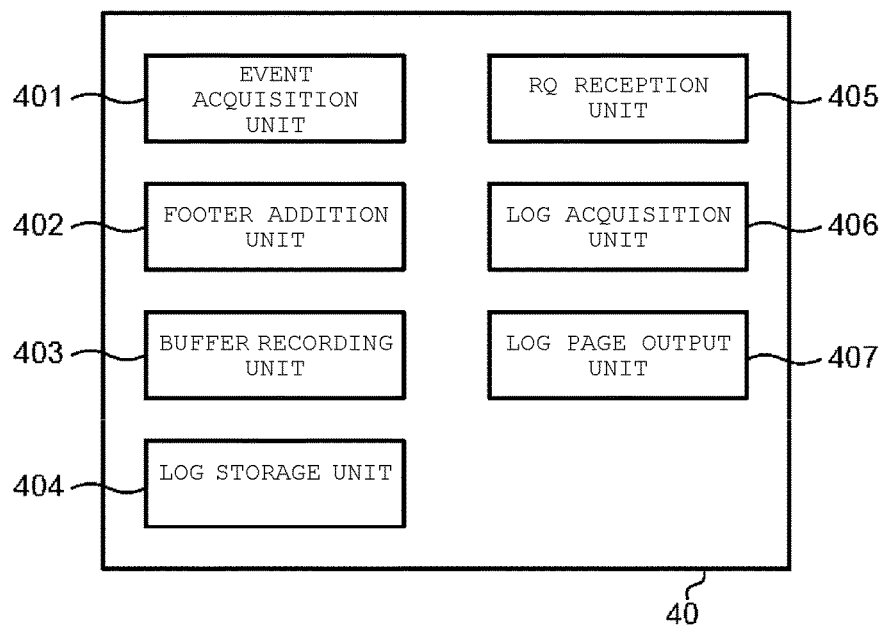
FIG. 2 is a block diagram illustrating a functional configuration of the semiconductor storage device according to the first embodiment.

Subsequently, a functional configuration of the second CPU 40 in the semiconductor storage device 10 according to at least one embodiment will be described in detail. As illustrated in FIG. 2, the second CPU 40 according to at least one embodiment has respective functional configurations of an event acquisition unit 401, a footer addition unit 402, a buffer recording unit 403, a log storage unit 404, a request reception unit (RQ reception unit) 405, a log acquisition unit 406, and a log page output unit 407.

The event acquisition unit 401 acquires (generates) event logs corresponding to a request from the host 50 or various events spontaneously occurring in the semiconductor storage device 10. The event logs acquired by the event acquisition unit 401 differ in size of entry of each log and frequency depending on types of events. The event acquisition unit 401 acquires the event logs in an order in which the events occur.

The footer addition unit 402 adds data including information for specifying a start position of an event log as a footer, to an end of the event log generated by the event acquisition unit 401. The footer includes, for example, a size of the event log and a relative address obtained from the size and the address of the footer. The information of the start position of the event log includes, for example, address information in which the event log is stored, or information of the size of the event log.

The buffer recording unit 403 records an event log to which a footer is added by the footer addition unit 402 in the log buffer 53. In at least one embodiment, the buffer recording unit 403 records the event log to which the footer is added from a low address toward a high address of the log buffer 53 in an order in which the events occur. That is, the buffer recording unit 403 records event logs in the log buffer 53 in the order of occurrence.

The log storage unit 404 stores an event log recorded in the log buffer 53 as log data in the NAND memory 11 via the NAND controller 36. When the certain number of event logs are recorded in the log buffer 53, the log storage unit 404 collectively stores all the event logs in the NAND memory 11. In this case, the log storage unit 404 stores the event logs recorded in the log buffer 53 in the NAND memory 11 in the recorded order.

The RQ reception unit 405 receives a log page request from the host 50 to the semiconductor storage device 10. The log page request from the host 50 is sent to the command controller 31 via the host interface circuit 22.

The log acquisition unit 406 reads individual event logs from the log data stored in the NAND memory 11 and sequentially records the event logs in the storage buffer 54. The log acquisition unit 406 sorts (rearranges) respective events included in the log data stored in the NAND memory 11 in a time series and records the events in the storage buffer 54. That is, the event logs stored in the NAND memory 11 in a time series of event occurrence are sorted in the order from newest event occurrence and are recorded in the storage buffer 54.

The log page output unit 407 outputs log data recorded in the storage buffer 54 to the host 50 as a log page. The log page output unit 407 transmits log data read from the storage buffer 54 to the host 50 via the host interface circuit 22.

Figure 3:
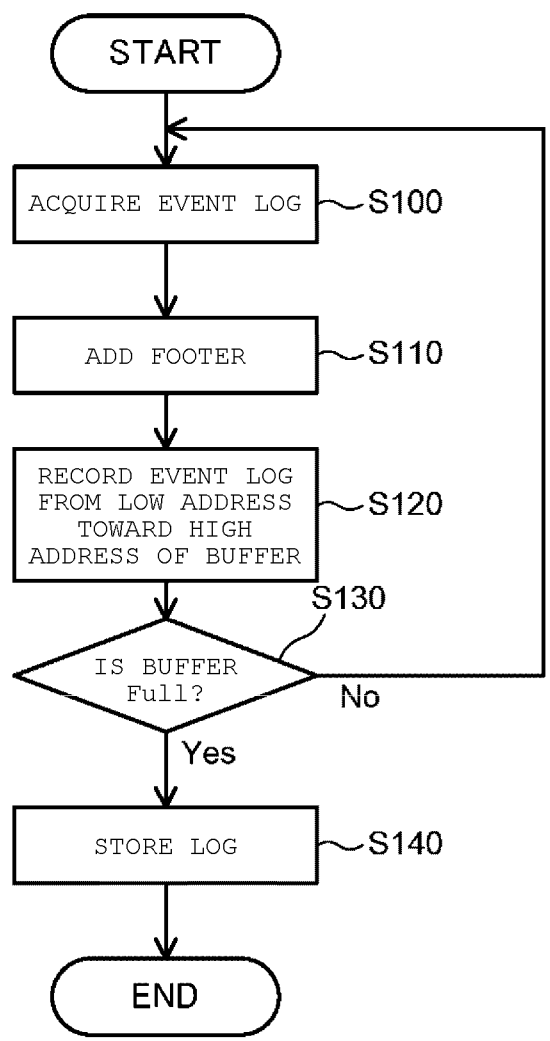
FIG. 3 is a flowchart illustrating a log storing operation of the semiconductor storage device according to the first embodiment.
Figure 5:
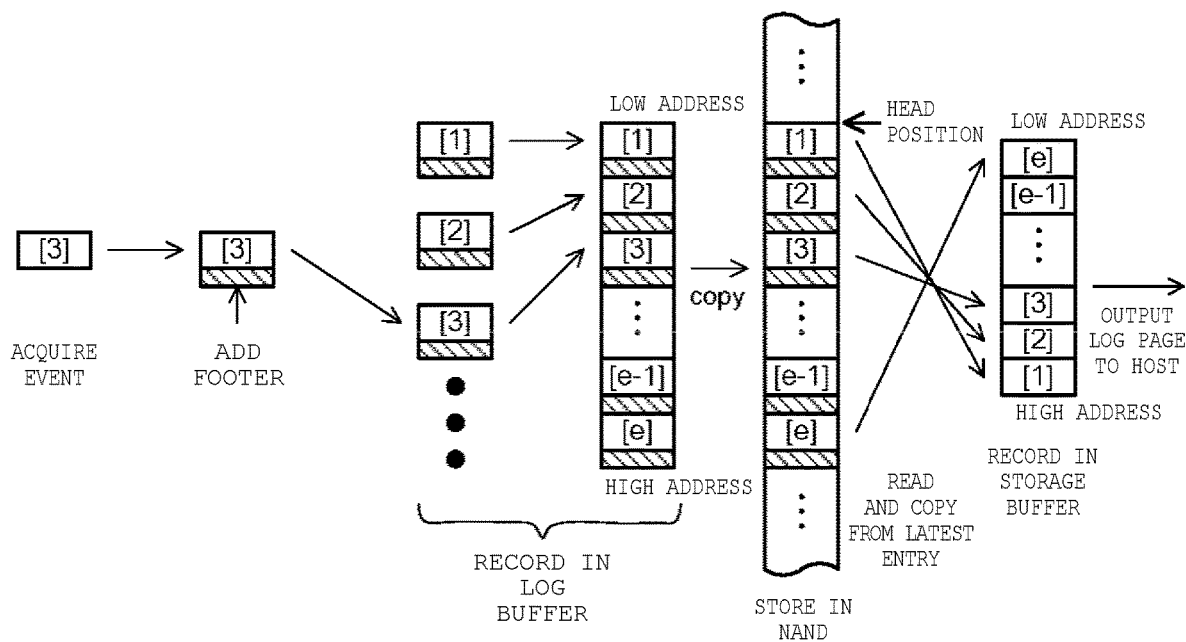
FIG. 5 is a diagram illustrating an outline of an event log process in the semiconductor storage device according to the first embodiment.

Subsequently, a log storing operation of the semiconductor storage device 10 according to the first embodiment will be described with reference to FIGS. 1 to 3 and FIG. 5. FIG. 3 is a flowchart illustrating the log storing operation of the semiconductor storage device 10 according to at least one embodiment. FIG. 5 schematically illustrates a state of data while an event is acquired, the event is recorded in a buffer, the event is stored in a NAND memory, and a log page is output in response to a request from a host, according to at least one embodiment. In FIG. 5, a numerical value in [ ] indicates an order in which events occur.

The event acquisition unit 401 acquires (generates) an event log corresponding to an event that occurs in the host 50 or the semiconductor storage device 10 (S100). FIG. 5 illustrates a state in which data of a third event log (hereinafter referred to as "event log [3]") among the acquired event logs is generated.

The footer addition unit 402 adds footer data to a data end of an event log generated by the event acquisition unit 401. In FIG. 5, the footer addition unit 402 adds a footer to the event log [3] generated by the event acquisition unit 401 (S110). The footer added here includes, for example, information for relatively specifying a start position of the event log [3] from a position of the added footer.

The buffer recording unit 403 records event logs with the footer in the order of event occurrence (an acquisition order of event logs) from a low address toward a high address of the log buffer 53 (S120). As a result, as illustrated in FIG. 5, an earliest event log [1] is recorded at the beginning of the storage area in the log buffer 53, and a footer of the latest event log [e] is recorded at the end of the storage area in the log buffer 53.

The log storage unit 404 monitors an available area of the log buffer 53. When the log buffer 53 is full of event logs (Yes in S130), for example, the log storage unit 404 copies content of the log buffer 53 to store in the NAND memory 11 (S140). FIG. 5 illustrates a state in which the log buffer 53 is full and is copied to the NAND memory 11 as is, as a result of recording the event log [1] to the event log [e] in the log buffer 53.

When there is an available area in the log buffer 53 (No in S130), respective processes of acquiring an event log, adding a footer, and storing in a log buffer are repeated (S100 to S130).

Figure 4:
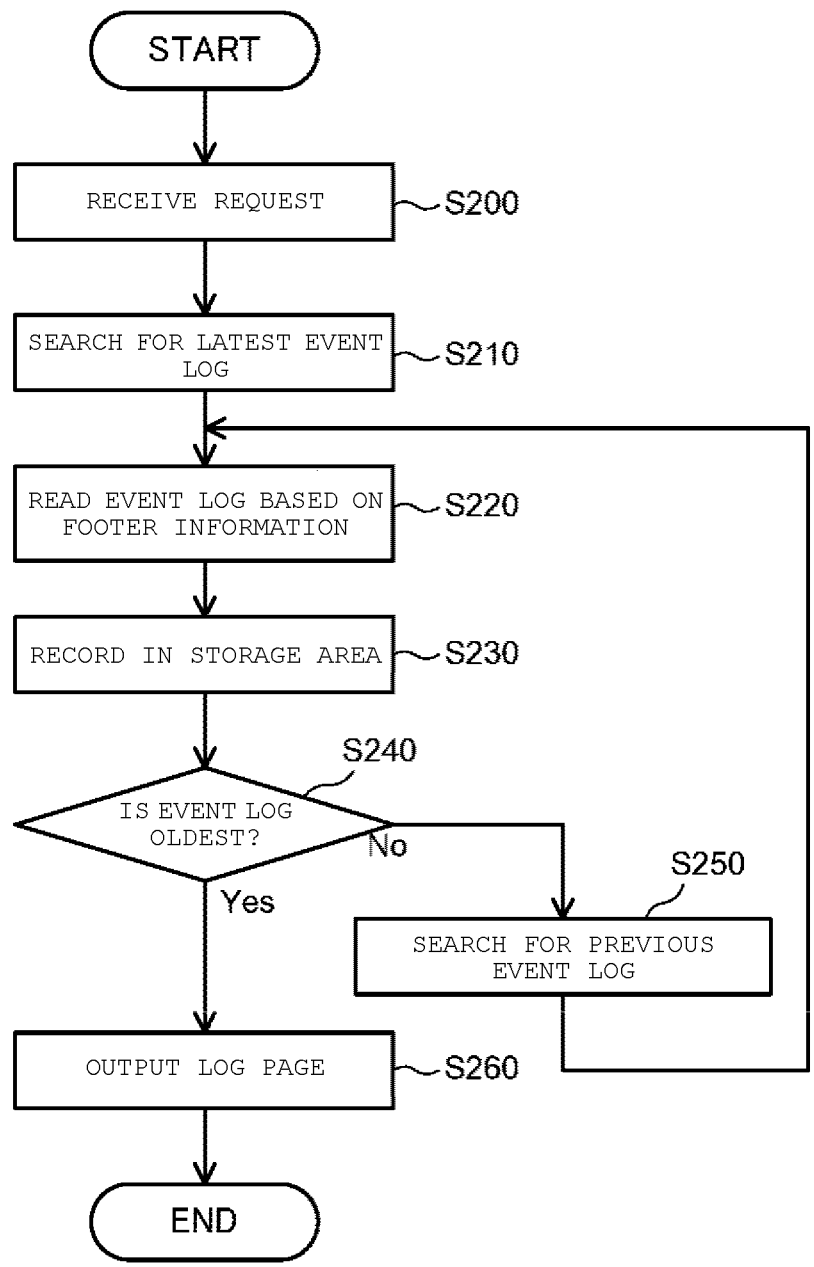
FIG. 4 is a flowchart illustrating a log output operation of the semiconductor storage device according to the first embodiment.

Next, a log output operation of the semiconductor storage device 10 according to the first embodiment will be described with reference to FIGS. 1, 4, and 5. FIG. 4 is a flowchart illustrating the log output operation of the semiconductor storage device 10 according to at least one embodiment.

The RQ reception unit 405 is in a standby state of a log request from the host 50. When the RQ reception unit 405 receives a request of a log page (S200), the log acquisition unit 406 searches for the latest event log from a head position toward an end of the storage area thereof in the log data stored in the NAND memory 11 (S210). In the example illustrated in FIG. 5, the log acquisition unit 406 finds a footer of the latest event log [e] when the footer of the event log [e] is accessed.

The log acquisition unit 406 acquires the start position of the event log [e] from content of the footer of the event log [e] and reads the event log [e] from the NAND memory 11 with reference to the start position (S220). Since the footer of the event log [e] includes information for specifying the start position of the event log [e], the log acquisition unit 406 can acquire only the event log [e] excluding the footer. Here, the storage buffer 54 is empty. The log acquisition unit 406 records data from the start position of the acquired event log [e] to immediately before the footer as the event log [e] at the head position of the storage buffer 54 (S230). Thereby, the event log [e] that does not include the footer is recorded at the head position of the storage buffer 54.

The log acquisition unit 406 determines whether or not the event log recorded in the storage buffer 54 immediately before is the oldest (first) event log of target logs (S240). This determination is made based on content of the footer. When the event log recorded in the storage buffer 54 is not the oldest event log (No in S240), the log acquisition unit 406 searches for the footer of a previous event log [e−1] (S250).

The log acquisition unit 406 acquires the head position of the storage area, which is in the NAND memory 11, of the event log [e] recorded in the storage buffer 54 immediately before in S230. Therefore, the log acquisition unit 406 can identify that there is a footer of the previous event log [e−1] at a position (that is, on a side of the head position of the storage area) before the start position of the event log [e]. The log acquisition unit 406 can acquire the start position of the previous event log [e−1] from content of the footer of the event log [e−1].

The log acquisition unit 406 reads the previous event log [e−1] from the NAND memory 11 with reference to the acquired start position (S220). The log acquisition unit 406 records the read previous event log [e−1] at a position next to the latest event log [e] in the storage buffer 54, that is, a higher address side than a position where the event log [e] is recorded (S230). As illustrated in FIG. 5, the operations illustrated in S220 to S250 are for recording an event log from log data stored in the NAND memory 11 in the storage buffer 54 in an order from the newest.

When the event log recorded in the storage buffer 54 is the oldest (first) event log (Yes in S240), the log page output unit 407 transmits the log data recorded in the storage buffer 54 to the host 50 as a log page (S260). The log acquisition unit 406 determines that the event log is the oldest (first) event log because a footer of the previous event log does not exist at a position immediately before a head position of the event log.

As such, the semiconductor storage device 10 according to at least one embodiment adds a footer to each event log when an event log is stored in the NAND memory 11. That is, the footer added to the event log makes event logs stored in the NAND memory 11 in a time series be sequentially read from the latest event log to the past event log. The semiconductor storage device 10 according to at least one embodiment does not need to perform a sorting process (a rearranging process) or the like of data when storing event logs. That is, it is possible to reduce a load when storing logs.

Second Embodiment

Figure 6:
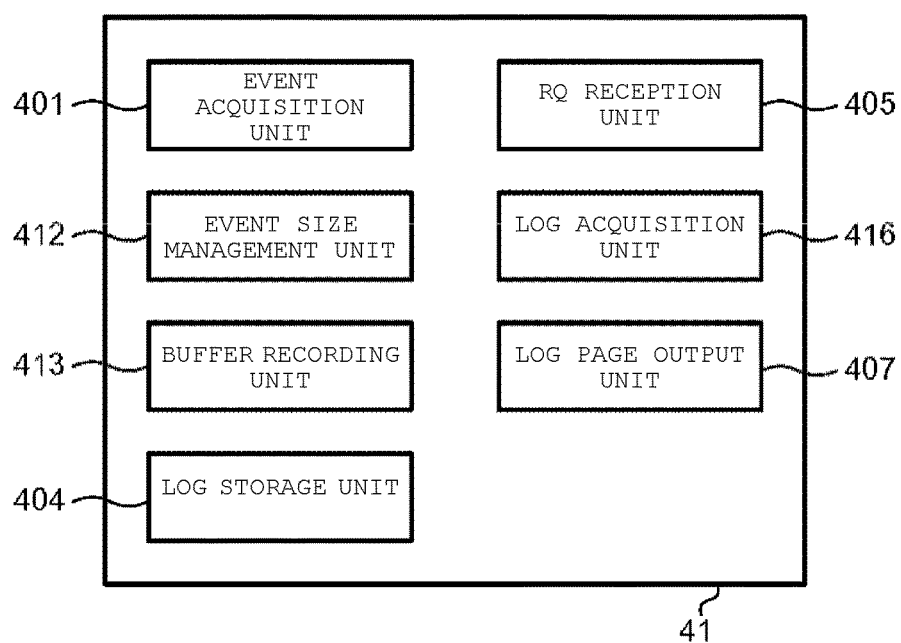
FIG. 6 is a block diagram illustrating a functional configuration of a semiconductor storage device according to a second embodiment.

Next, a semiconductor storage device 10a according to a second embodiment will be described with reference to FIGS. 1 and 6. FIG. 6 is a block diagram illustrating a functional configuration of the semiconductor storage device 10a according to at least one embodiment. The semiconductor storage device 10a according to at least one embodiment is obtained by modifying part of the functional configuration of the second CPU 40 according to the first embodiment illustrated in FIG. 1. Therefore, common elements are illustrated with common reference numerals attached thereto, and duplicate description will be omitted.

In the semiconductor storage device 10 according to at least one embodiment, event logs relating to each event are stored in the NAND memory 11 in the order of occurrence, and events are sorted in order from the newest to the oldest in response to a request of the host 50 to generate a log page. That is, the semiconductor storage device 10 according to the at least one stores the event logs in the NAND memory 11 in a time series and reads the event logs from the NAND memory 11 in an order in which events occur, and thereby, a log page in which events are sorted in the order from the newest is generated. The semiconductor storage device 10a according to the second embodiment stores event logs in the NAND memory 11 in an order in which events occur and generates a log page in which the event logs read from the NAND memory 11 are arranged in the order.

As illustrated in FIGS. 1 and 6, the semiconductor storage device 10a according to the second embodiment includes a second CPU 41 including an event acquisition unit 401, an event size management unit 412, a buffer recording unit 413, a log storage unit 404, an RQ reception unit 405, a log acquisition unit 416 and a log page output unit 407. The event acquisition unit 401, the log storage unit 404, the RQ reception unit 405, and the log page output unit 407 have the same configurations and operations as in the first embodiment, and thus, detailed description thereof will be omitted or simplified.

The event size management unit 412 acquires sizes of event logs relating to each event. The event size management unit 412 has a function of managing an event log to be recorded in the log buffer 53 by using a size of the acquired event log.

The buffer recording unit 413 records event logs of events occurring in the log buffer 53 in a reverse order of a time series. That is, when compared with the buffer recording unit 403 according to the first embodiment, the buffer recording unit 413 according to the second embodiment is different in that the event logs are recorded in the log buffer 53 in an order of a different time series.

The log acquisition unit 416 reads log data stored in the NAND memory 11 to record in the storage buffer 54. When compared with the log acquisition unit 406 according to the first embodiment, the log acquisition unit 416 according to the second embodiment is different in that event logs stored in the NAND memory 11 are recorded in the storage buffer 54 in the same order.

Figure 7:
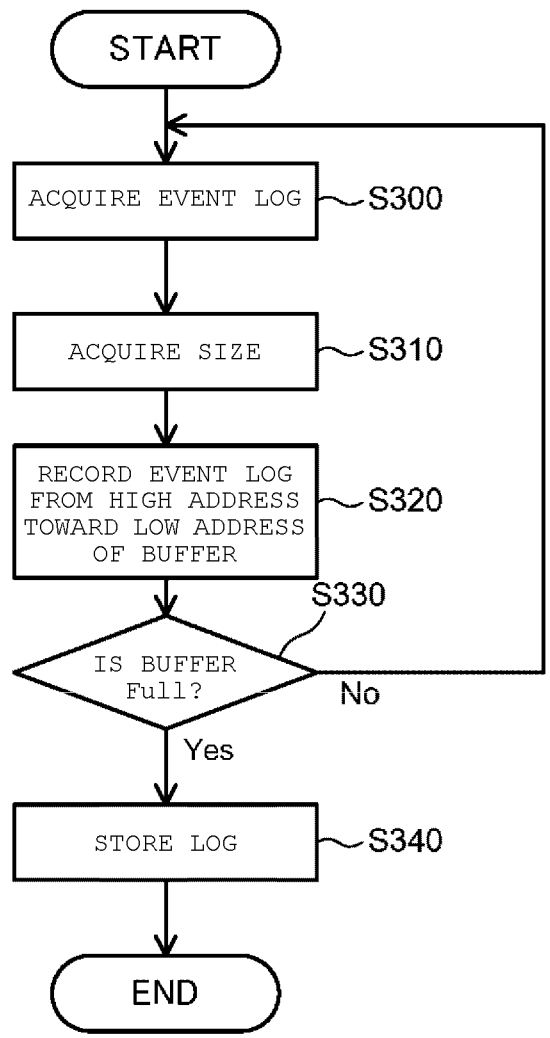
FIG. 7 is a flowchart illustrating a log storing operation of the semiconductor storage device according to the second embodiment.
Figure 9:
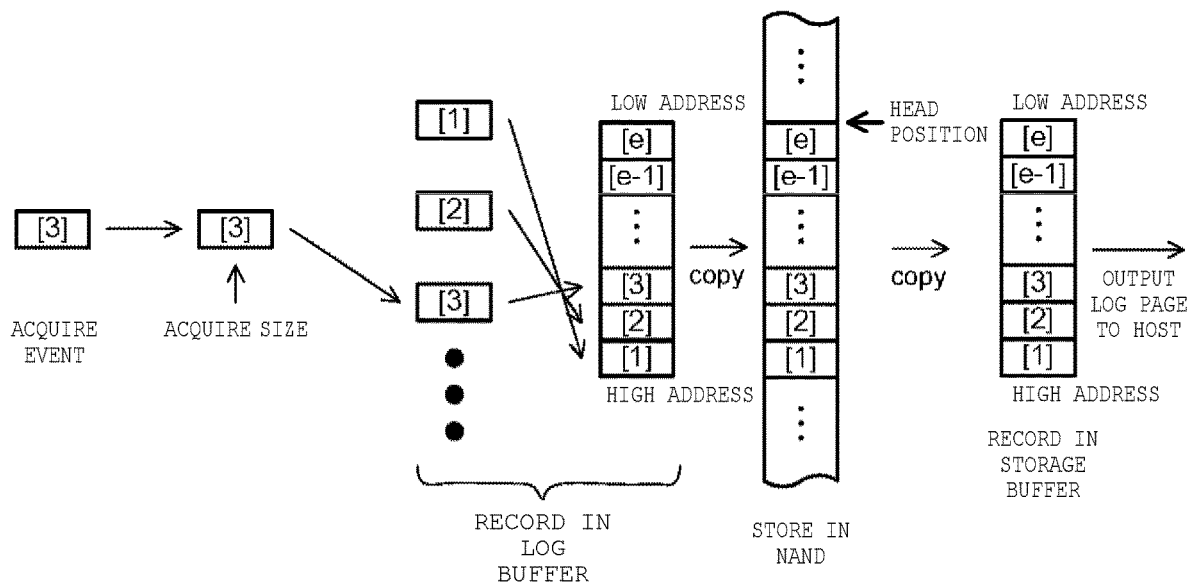
FIG. 9 is a diagram illustrating an outline of an event log process in the semiconductor storage device according to the second embodiment.

Subsequently, a log storing operation of the semiconductor storage device 10a according to the second embodiment will be described with reference to FIGS. 1, 6, 7, and 9. FIG. 7 is a flowchart illustrating the log storing operation of the semiconductor storage device 10a according to at least one embodiment. FIG. 9 schematically illustrates a state of data while an event is acquired, the event is recorded in a buffer, the event is stored in a NAND memory, and a log page is output in response to a request from a host, according to at least one embodiment. In FIG. 9, a numerical value in [ ] indicates an order in which events occur.

The event acquisition unit 401 acquires (generates) an event log corresponding to an event occurring in the host 50 or the semiconductor storage device 10a (S300). FIG. 9 illustrates a state in which a third event log (event log [3]) of the acquired events is generated.

The event size management unit 412 acquires a data size of an event log acquired by the event acquisition unit 401 (S310).

The buffer recording unit 413 sequentially records the event logs acquired by the event acquisition unit 401 from a high address toward a low address of the log buffer 53 in a time series from the oldest event log (S320). That is, the buffer recording unit 413 records event logs from a position shifted from a high address of the log buffer 53 to a low address side by an event size by using an event size managed by the event size management unit 412.

The log storage unit 404 monitors an available area of the log buffer 53. When the log buffer 53 is full of event logs (Yes in S330), for example, the log storage unit 404 copies content of the log buffer 53 to store in the NAND memory 11 (S340). FIG. 9 illustrates a state in which the log buffer 53 is full and is copied to the NAND memory 11 as is, as a result of recording the event log [e] to the event log [1] in the log buffer 53.

When there is an available area in the log buffer 53 (No in S330), respective processes of acquiring an event log, acquiring a size, and recording in a log buffer are repeated (S300 to S330).

Figure 8:
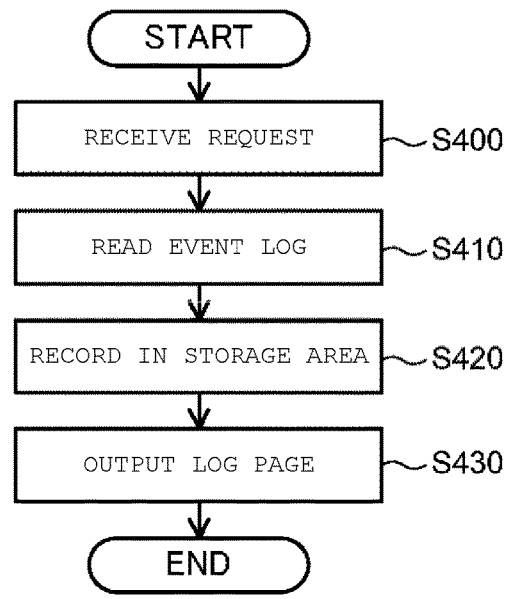
FIG. 8 is a flowchart illustrating a log output operation of the semiconductor storage device according to the second embodiment.

Next, a log output operation of the semiconductor storage device 10a according to the second embodiment will be described with reference to FIGS. 1, 6, 8, and 9. FIG. 8 is a flowchart illustrating the log output operation of the semiconductor storage device 10a according to at least one embodiment.

The RQ reception unit 405 is in a standby state of a log request from the host 50. When the RQ reception unit 405 receives a request for a log page (S400), the log acquisition unit 416 reads log data stored in the NAND memory 11 (S410). In the log data read here, a plurality of access logs are arranged in a reverse order of a time series. The log acquisition unit 416 records the read log data in the storage buffer 54 (S420). That is, the log acquisition unit 416 records the log data stored in the NAND memory 11 in the storage buffer 54 without changing an order of the event logs.

The log page output unit 407 transmits the log data recorded in the storage buffer 54 to the host 50 as a log page (S430).

As such, in the semiconductor storage device 10a according to at least one embodiment, an order of event logs is changed in a time series before log data is stored in the NAND memory 11. That is, when there is a log request from the host 50, the log data stored in the NAND memory 11 can be transmitted to the host 50 as it is as a log page.

Further, when compared with the first embodiment, in the semiconductor storage device 10a according to the second embodiment, an order is changed to a reverse order of a time series when the generated event logs are recorded in the log buffer 53. Since an order of event logs is changed by changing an order of recording in the buffer, data calculation such as addition of a footer is not required. Further, in the semiconductor storage device 10a according to the second embodiment, a log page can be generated without changing an order of event logs stored in the NAND memory 11. That is, it is possible to reduce a process load when generating a log page.

Event log storing operations and event log read operations of semiconductor storage devices according to the first and second embodiments described above are implemented by a computer program executed by the second CPUs 40 and 41, but may be implemented by a hardware circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor storage device comprising:
   a non-volatile first memory;
   a second memory including a first area for recording data to be recorded in the first memory and a second area for recording data read from the first memory; and
   a memory controller configured to control the first memory,
   wherein the memory controller is configured to:
      acquire a plurality of event logs each relating to a respective event that occurs in the semiconductor storage device,
      add a footer to an end of each of the event logs, the footer specifying a start position of data of each of the event logs,
      sequentially record each of the event logs to which the footer is added, in an order of occurrence of the respective event of the corresponding event log, from a first address toward a second address of the first area, the first address being lower than the second address in the first area,
      store the event logs recorded in the first area in the first memory, and
      sequentially read the event logs stored in the first memory in an order starting with a latest event log and ending with an oldest event log within the event logs to be read, based on each footer added to corresponding event logs, to sequentially record the read event logs from a third address toward a fourth address of the second area in a read order of the read event logs, the third address being lower than the fourth address in the second area.

2. The semiconductor storage device according to claim 1, wherein each footer includes information indicating a relative start position of data of a corresponding event log.

3. The semiconductor storage device according to claim 1, wherein the memory controller is configured to read the event logs from the first memory to record the event logs in the second area in response to a request from a host device connected to the semiconductor storage device.

4. The semiconductor storage device according to claim 3, wherein the event logs include a log relating to a process performed according to a request from a host device connected to the semiconductor storage device or a log relating to a process spontaneously performed by the semiconductor storage device.

5. The semiconductor storage device according to claim 1, wherein the event logs include a log relating to a process performed according to a request from a host device connected to the semiconductor storage device or a log relating to a process spontaneously performed by the semiconductor storage device.

6. The semiconductor storage device according to claim 1, wherein the first memory includes a NAND memory and the second memory includes a random access memory.

7. A control method of a semiconductor storage device including a non-volatile first memory and a second memory, the second memory including a first area for recording data to be recorded in the first memory and a second area for recording data read from the first memory, the control method comprising:
   acquiring a plurality of event logs each relating to a respective event that occurs in the semiconductor storage device;
   adding a footer to an end of each of the event logs, the footer specifying a start position of data of each of the event logs;
   sequentially recording each of the event logs to which the footer is added, in an order of occurrence of the respective event of the corresponding event log, from a first address toward a second address of the first area, the first address being lower than the second address in the first area;

storing the event logs recorded in the first area in the first memory; and sequentially reading the event logs stored in the first memory in an order starting with a latest event log and ending with an oldest event log within the event logs to be read, based on each footer added to corresponding event logs, to sequentially record the read event logs from a third address toward a fourth address of the second area in a read order of the read event logs, the third address being lower than the fourth address in the second area.

8. The method according to claim 7, wherein each footer includes information indicating a relative start position of data of a corresponding event log.

9. The method according to claim 7, further comprising:

reading the event logs from the first memory to record the event logs in the second area in response to a request from a host device connected to the semiconductor storage device.

10. The method according to claim 7, wherein the event logs include a log relating to a process performed according to a request from a host device connected to the semiconductor storage device or a log relating to a process spontaneously performed by the semiconductor storage device.

11. A semiconductor storage device comprising:

a non-volatile first memory;

a second memory including a first area for recording data to be recorded in the first memory and a second area for recording data read from the first memory; and a memory controller configured to control the first memory, wherein the memory controller is further configured to:

acquire a plurality of event logs each relating to a respective event that occurs in the semiconductor storage device, sequentially record each event log of the plurality of event logs in an order of occurrence of the respective event of the corresponding event log, from a first address toward a second address of the first area, the first address being higher than the second address in the first area, store the event logs recorded in the first area in the first memory, and sequentially reading the event logs stored in the first memory in an order starting with a latest event log and ending with an oldest event log within the event logs to be read to sequentially record the read event logs in a read order from a third address toward a fourth address of the second area, the third address being lower than the fourth address in the second area.

12. The semiconductor storage device according to claim 11, wherein the memory controller is further configured to:

acquire sizes of the acquired event logs, and store, before the first area becomes full, the event logs recorded in the first area in the first memory based on the acquired sizes of the acquired event logs.

13. The semiconductor storage device according to claim 11, wherein the memory controller is configured to read the event logs from the first memory to record the event logs in the second area in response to a request from a host device connected to the semiconductor storage device.

14. The semiconductor storage device according to claim 13, wherein the event logs include a log relating to a process performed according to a request from a host device connected to the semiconductor storage device or a log relating to a process spontaneously performed by the semiconductor storage device.

15. The semiconductor storage device according to claim 11, wherein the event logs include a log relating to a process performed according to a request from a host device connected to the semiconductor storage device or a log relating to a process spontaneously performed by the semiconductor storage device.

16. The semiconductor storage device according to claim 11, wherein the first memory includes a NAND memory and the second memory includes a random access memory.

17. A control method of a semiconductor storage device including a non-volatile first memory and a second memory, the second memory including a first area for recording data to be recorded in the first memory and a second area for recording data read from the first memory, the control method comprising:

acquiring a plurality of event logs each relating to a respective event that occurs in the semiconductor storage device;

sequentially recording each event log of the plurality of event logs in an order of occurrence of the respective event of the corresponding event log, from a first address toward a second address of the first area, the first address being higher than the second address in the first area;

storing the event logs recorded in the first area in the first memory; and sequentially reading the event logs stored in the first memory in an order starting with a latest event log and ending with an oldest event log within the event logs to be read to sequentially record the read event logs in a read order from a third address toward a fourth address of the second area, the third address being lower than the fourth address in the second area.

18. The method according to claim 17, further comprising:

acquiring sizes of the acquired event logs, and storing, before the first area becomes full, the event logs recorded in the first area in the first memory based on the acquired sizes of the acquired event logs.

19. The method according to claim 17, further comprising:

reading the event logs from the first memory to record the event logs in the second area in response to a request from a host device connected to the semiconductor storage device.

20. The method according to claim 17, wherein the event logs include a log relating to a process performed according to a request from a host device connected to the semiconductor storage device or a log relating to a process spontaneously performed by the semiconductor storage device.

* * * * *